United States Patent
Koshihara

(10) Patent No.: US 7,149,507 B2
(45) Date of Patent: Dec. 12, 2006

(54) MAIL SERVER, AND MOBILE COMMUNICATION TERMINAL

(75) Inventor: Ichimi Koshihara, Urayasu (JP)

(73) Assignee: NTT DoCoMo, Inc., Tokyo (JP)

( * ) Notice: Subject to any disclaimer, the term of this patent is extended or adjusted under 35 U.S.C. 154(b) by 226 days.

(21) Appl. No.: 10/715,860

(22) Filed: Nov. 19, 2003

(65) Prior Publication Data

US 2004/0152449 A1    Aug. 5, 2004

(30) Foreign Application Priority Data

Nov. 20, 2002  (JP)  .......................... P2002-336864

(51) Int. Cl.
H04M 3/42    (2006.01)

(52) U.S. Cl. .................. 455/417; 455/418; 455/445; 455/420; 709/206; 709/209; 379/67.1

(58) Field of Classification Search .............. 455/418, 455/412.2, 417, 445, 420; 709/206, 207, 709/209; 713/155; 379/67.1
See application file for complete search history.

(56) References Cited

U.S. PATENT DOCUMENTS

| 5,550,535 | A | | 8/1996 | Park |
| 5,742,668 | A | * | 4/1998 | Pepe et al. .................. 455/415 |
| 5,995,597 | A | | 11/1999 | Woltz et al. |
| 6,049,323 | A | | 4/2000 | Rockwell et al. |
| 2002/0013869 | A1 | * | 1/2002 | Taniguchi et al. ............. 710/33 |
| 2002/0031206 | A1 | * | 3/2002 | Matsunsami ............... 379/67.1 |
| 2002/0087647 | A1 | * | 7/2002 | Quine et al. ................. 709/206 |
| 2002/0137539 | A1 | * | 9/2002 | Takahashi et al. ........... 455/550 |
| 2002/0143885 | A1 | * | 10/2002 | Ross, Jr. ...................... 709/207 |
| 2004/0019643 | A1 | * | 1/2004 | Zirnstein, Jr. ............... 709/206 |
| 2004/0087337 | A1 | * | 5/2004 | Takae et al. ................. 455/558 |
| 2005/0108520 | A1 | * | 5/2005 | Yamamoto et al. .......... 713/155 |
| 2005/0149487 | A1 | * | 7/2005 | Celik ............................ 707/1 |

FOREIGN PATENT DOCUMENTS

| CN | 1355499 | 6/2002 |
| JP | 2001-156830 | 6/2001 |
| JP | 2002-171281 | 6/2002 |
| JP | 02002215586 | * 8/2002 |
| JP | 02002300655 | * 10/2002 |
| WO | WO 98/37680 | 8/1998 |
| WO | WO 01/47291 | 6/2001 |

* cited by examiner

*Primary Examiner*—Danh Cong Le
(74) *Attorney, Agent, or Firm*—Oblon, Spivak, McClelland, Maier & Neustadt, P.C.

(57) ABSTRACT

An object of the present invention is to provide a mail server that is capable of obtaining the information in a specific electronic mail efficiently. The mail server records an address notified by a mobile communication terminal as a recorded address, attaches automatic opening identification information to electronic mail, from among the electronic mail addressed to the mobile communication terminal, which has a transmission source address that matches the recorded address, and delivers this electronic mail repeatedly. When the mobile communication terminal receives electronic mail to which automatic opening identification information is attached, the electronic mail is opened automatically.

12 Claims, 7 Drawing Sheets

MAIL SERVER, AND MOBILE COMMUNICATION TERMINAL

BACKGROUND OF THE INVENTION

1. Field of the Invention

The present invention relates to a mail server for delivering electronic mail addressed to a mobile communication terminal to the mobile communication terminal, a mobile communication terminal for receiving the delivered electronic mail.

2. Related Background Art

In recent years, with the development of information communication technology, it has become common for electronic mail to be transmitted and received using mobile communication terminals such as portable telephones. In an electronic mail system using a mobile communication terminal, an electronic mail that is transmitted from a transmission source terminal to a mobile communication terminal serving as a transmission destination terminal is received in a reception side mail server, and automatically delivered from the reception side mail server to the mobile communication terminal. As a result, the user of the mobile communication terminal may read the electronic mail that has been delivered to the mobile communication terminal whenever s/he wishes.

However, when the mobile communication terminal is unable to receive electronic mail, for example when the mobile communication terminal is in a location at which radio waves cannot be received or when the power of the mobile communication terminal has been switched off, the reception side mail server does not deliver the electronic mail to the mobile communication terminal and the electronic mail is stored in the reception side mail server. Hence when an urgent electronic mail is sent, the sender does not know whether the electronic mail has been delivered, and since the sender does not know whether the electronic mail has been received in the mobile communication terminal, the sender may have to send the same mail many times. Moreover, the receiver can only learn that a mail is being stored by making an enquiry to the reception side mail server or waiting for the arrival of the next mail.

Systems and the like are known for dealing with this type of problem (for example, Japanese Unexamined Patent Application Publication 2001-156830). In such systems, the receiver side is notified when a mobile communication terminal cannot receive electronic mail, and when the mobile communication terminal becomes able to receive electronic mail, electronic mail is delivered to the mobile communication terminal.

SUMMARY OF THE INVENTION

With the prevalence of mobile communications today, however, if the receiver side is notified that the mobile communication terminal cannot receive electronic mail every time an electronic mail is sent to the mobile communication terminal while the mobile communication terminal is incapable of reception, the amount of electronic mail used for this notification will increase, causing an increase in traffic. Furthermore, even if an electronic mail is delivered, it is not always the case that the electronic mail will be opened after being stored in the receiver side mobile communication terminal. Particularly when the person to be provided with information via electronic mail is an elderly person or a child who is unaccustomed to electronic mail operations on a mobile communication terminal, the elderly person or child may be unable to view the received mail. Further, when the user of the mobile communication terminal is participating in a meeting or lecture, the power of the mobile communication terminal is often switched off, and hence the user of the mobile communication terminal who is participating in a meeting or the like is unable to efficiently obtain the information in an urgent electronic mail or the like from a specific sender.

An object of the present invention is to provide a mail server, and mobile communication terminal, which enable information in a specific electronic mail to be obtained efficiently.

In order to solve the problems described above, a mail server of the present invention delivers to a mobile communication terminal electronic mail addressed to the mobile communication terminal, and comprises first recording means for recording as a recorded address an address notified by the mobile communication terminal, first comparing means for comparing a transmission source address comprised in an electronic mail addressed to the mobile communication terminal with the recorded address recorded by the first recording means, and first delivery means which, when the recorded address and transmission source address match according to the comparison performed by the first comparing means, deliver electronic mail comprising this transmission source address repeatedly to the mobile communication terminal.

A program of the present invention is executed by a mail server for delivering to a mobile communication terminal electronic mail addressed to the mobile communication terminal, and causes a computer to realize a first recording function for recording an address notified by the mobile communication terminal as a recorded address, a first comparing function for comparing a transmission source address comprised in an electronic mail addressed to the mobile communication terminal with the recorded address recorded by the first recording function, and a first delivery function whereby, when the recorded address and transmission source address match according to the comparison performed by the first comparing function, electronic mail comprising this transmission source address is delivered repeatedly to the mobile communication terminal.

Note that in this specification, the term "electronic mail" includes electronic mail with an attached file.

According to the mail server and program of the present invention as described above, a specific address can be recorded in the mail server, and electronic mail comprising as a transmission source address an address which matches the recorded address can be delivered by the mail server repeatedly. As a result, a mobile communication terminal can reliably obtain electronic mail from a recorded address.

It is preferable that in the mail server of the present invention, the first recording means record addresses notified by the mobile communication terminal as recorded addresses each having different redelivery intervals in accordance with instructions from the mobile communication terminal, that the first comparing means compare the transmission source address with the recorded addresses each having different redelivery intervals, and that the first delivery means deliver electronic mail comprising a transmission source address which matches a recorded address repeatedly at the redelivery interval recorded for the recorded address which matches the transmission source address according to the comparison performed by the first comparing means.

Similarly, it is preferable that in the program of the present invention, addresses notified by the mobile communication terminal be recorded by the first recording function as recorded addresses each having different redelivery intervals in accordance with instructions from the mobile communication terminal, that the transmission source address and recorded addresses each having different redelivery intervals be compared by the first comparing function, and that electronic mail comprising a transmission source address which matches a recorded address be delivered repeatedly by the first delivery function at the redelivery interval recorded for the recorded address which matches the transmission source address according to the comparison performed by the first comparing function.

According to such a constitution, the mail server is capable of recording addresses each having a different redelivery interval. The mail server is also capable of delivering an electronic mail comprising a transmission source address that matches one of the recorded addresses repeatedly at the redelivery interval that is recorded for the recorded address that matches the transmission source address.

It is further preferable that in the mail server of the present invention, the first recording means record addresses notified by the mobile communication terminal as recorded addresses each having a different number of redelivery times in accordance with instructions from the mobile communication terminal, that the first comparing means compare the transmission source address with the recorded addresses each having a different number of redelivery times, and that the first delivery means deliver electronic mail comprising a transmission source address which matches a recorded address repeatedly up to the number of redelivery times recorded for the recorded address which matches the transmission source address according to the comparison performed by the first comparing means.

Similarly, it is preferable that in the program of the present invention, addresses notified by the mobile communication terminal be recorded by the first recording function as recorded addresses each having a different number of redelivery times in accordance with instructions from the mobile communication terminal, that the transmission source address and recorded addresses each having a different number of redelivery times be compared by the first comparing function, and that electronic mail comprising a transmission source address which matches a recorded address be delivered repeatedly by the first delivery function up to the number of redelivery times recorded for the recorded address which matches the transmission source address according to the comparison performed by the first comparing function.

According to such a constitution, the mail server is capable of recording addresses each having a different number of redelivery times. The mail server is also capable of delivering electronic mail comprising a transmission source address that matches one of the recorded addresses repeatedly until the number of redelivery times that is recorded for the recorded address matching the transmission source address is reached.

Further, in order to solve the aforementioned problems, a mail server of the present invention delivers to a mobile communication terminal electronic mail addressed to the mobile communication terminal, and comprises second recording means for recording an address notified by the mobile communication terminal as a recorded address, second comparing means for comparing a transmission source address comprised in an electronic mail addressed to the mobile communication terminal with the recorded address recorded by the second recording means, identification information attachment means which, when the recorded address and transmission source address match according to the comparison performed by the second comparing means, attach to an electronic mail comprising this transmission source address automatic opening identification information serving as a trigger for implementing processing to cause the mobile communication terminal to automatically open the electronic mail upon reception of the electronic mail, and second delivery means for delivering to the mobile communication terminal electronic mail to which automatic opening identification information is attached.

Further, a program of the present invention is executed by a mail server for delivering to a mobile communication terminal electronic mail addressed to the mobile communication terminal, and causes a computer to realize a second recording function for recording an address notified by the mobile communication terminal as a recorded address, a second comparing function for comparing a transmission source address comprised in an electronic mail addressed to the mobile communication terminal with the recorded address recorded by the second recording function, an identification information attachment function whereby, when the recorded address and transmission source address match according to the comparison performed by the second comparing function, automatic opening identification information is attached to an electronic mail comprising this transmission source address, this automatic opening identification information serving as a trigger for implementing processing to cause the mobile communication terminal to automatically open the electronic mail upon reception of the electronic mail, and a second delivery function for delivering to the mobile communication terminal electronic mail to which automatic opening identification information is attached.

According to such a constitution, the mail server is capable of recording an electronic mail address in order to specify electronic mail that is to be automatically opened. The mail server is also capable of attaching identification information to electronic mail comprising a transmission source address which matches the recorded address, this identification information serving as a trigger for implementing processing to cause the mobile communication terminal, upon reception of the electronic mail, to automatically open the electronic mail, and then delivering the electronic mail.

In order to solve the aforementioned problems, a mobile communication terminal of the present invention receives electronic mail from a mail server which functions to deliver electronic mail after attaching automatic opening identification information to an electronic mail comprising a recorded address as a transmission source address, this automatic opening identification information serving as a trigger for implementing processing to cause the mobile communication terminal to automatically open the electronic mail upon reception of the electronic mail. The mobile communication terminal comprises first automatic opening means which, when electronic mail delivered from the mail server is received and automatic opening identification information is detected in the electronic mail, automatically open the electronic mail.

A program of the present invention is executed by a mobile communication terminal for receiving electronic mail from a mail server which functions to deliver electronic mail after attaching automatic opening identification information to an electronic mail comprising a recorded address as a transmission source address, this automatic opening identification information serving as a trigger for implementing processing to cause the mobile communication terminal to automatically open the electronic mail upon reception of the electronic mail. The program causes a computer to realize a first automatic opening function whereby, when electronic mail delivered from the mail server is received and automatic opening identification information is detected in the electronic mail, the electronic mail is automatically opened.

According to such a constitution, the mobile communication terminal is capable of automatically opening electronic mail to which automatic opening identification information is attached.

Further, in order to solve the aforementioned problems, a mobile communication terminal of the present invention receives electronic mail delivered from a mail server, and comprises third recording means for recording an inputted address as a recorded address, and second automatic opening means which, when a transmission source address comprised in an electronic mail received from the mail server matches the recorded address recorded by the third recording means, automatically open the electronic mail comprising this transmission source address.

A program of the present invention is executed by a mobile communication terminal for receiving electronic mail delivered from a mail server, and causes a computer to realize a third recording function for recording an inputted address as a recorded address, and a second automatic opening function whereby, when a transmission source address comprised in an electronic mail received from the mail server matches the recorded address recorded by the third recording function, the electronic mail comprising this transmission source address is automatically opened.

According to such a constitution, the mobile communication terminal is capable of recording an address. The mobile communication terminal is also capable of automatically opening a received electronic mail, or more specifically an electronic mail comprising a transmission source address that matches the recorded address.

BRIEF DESCRIPTION OF THE DRAWINGS

The present invention may be more readily described with reference to the accompanying drawings, in which.

DESCRIPTION OF THE PREFERRED EMBODIMENTS

Preferred embodiments of the present invention will be described below with reference to the drawings. Note that throughout all of the drawings, identical or corresponding constitutional elements have been allocated identical reference symbols, and duplicate description thereof has been omitted.

Figure 1:
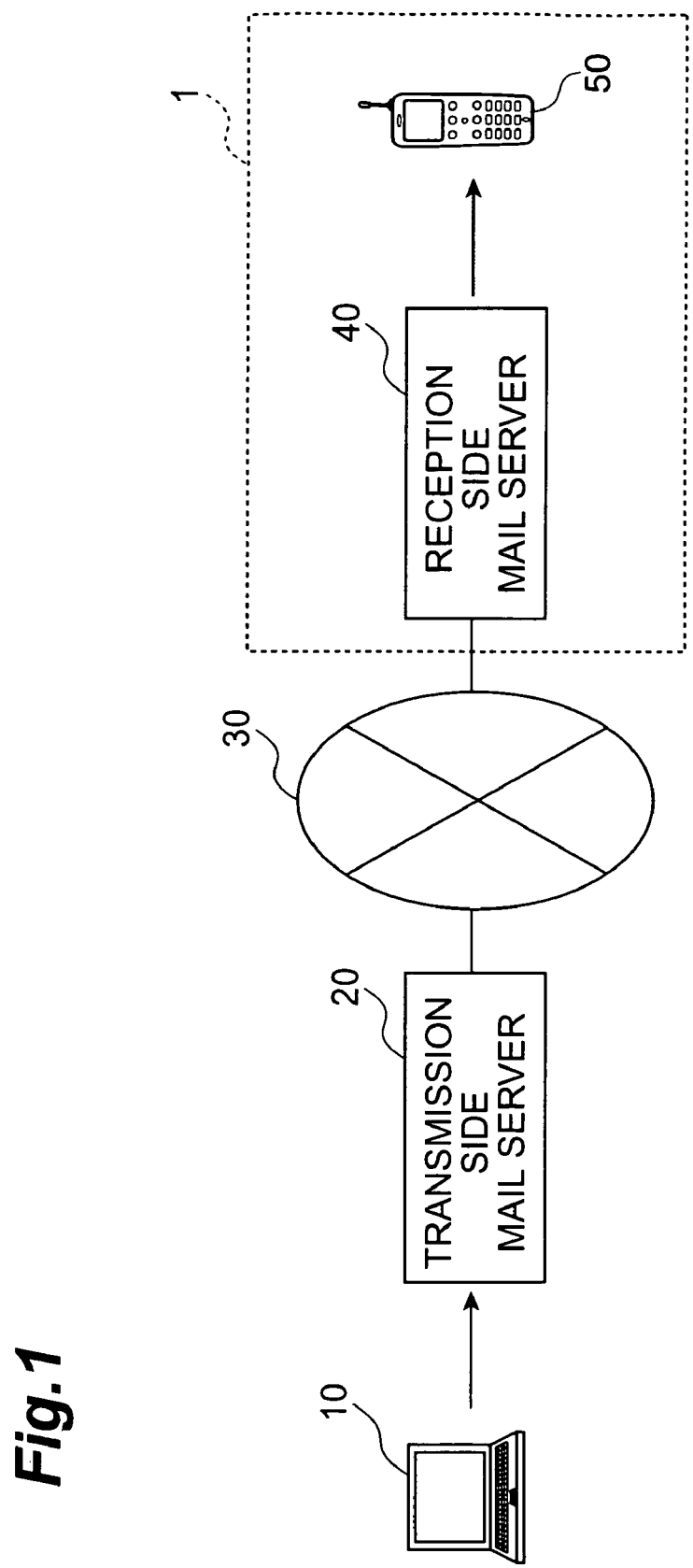
FIG. 1 is a schematic block diagram of a network comprising a mail delivery system according to a first embodiment.

FIG. 1 is a schematic block diagram of the constitution of an electronic mail transceiving network comprising a mail delivery system 1 of this embodiment. The electronic mail transceiving network is constituted by a transmission source terminal 10, a transmission side mail server 20, a network 30 such as the Internet, and a reception side mail server 40 and a mobile communication terminal 50 of the mail delivery system 1.

The transmission source terminal 10 is an information terminal capable of transmitting and receiving electronic mail such as a personal computer, and comprises a CPU (central processing unit), a storage device such as memory, a communication device used to transmit and receive mail, an input device such as a mouse or keyboard, a display device such as a display, and so on. Note that the transmission source terminal 10 may be a portable telephone or the like.

The transmission side mail server 20 and reception side mail server 40 are server systems for transmitting and receiving electronic mail using protocols such as SMTP (Simple Mail Transfer Protocol) and POP3 (Post Office Protocol version 3). Physically, these systems are constituted as a computer system (for example, a work station or a personal computer) comprising a CPU (central processing unit), memory, an input device such as a mouse or keyboard, a display device such as a display, a storage device such as a hard disk, and so on. Electronic mail transmitted from the transmission source terminal 10 is received in the reception side mail server 40 through the transmission side mail server 20 and network 30. Note that the distinction made between the transmission side mail server 20 and reception side mail server 40 is merely for ease of description, and as described above, both the transmission side mail server 20 and reception side mail server 40 function as server systems for transmitting and receiving electronic mail.

The mobile communication terminal 50 is an information terminal capable of transmitting and receiving electronic mail such as a portable telephone or portable information terminal, and comprises a CPU (central processing unit), a storage device such as memory, a communication device used to transmit and receive mail, an input device such as buttons, a display device such as a display, and so on.

The reception side mail server 40 and mobile communication terminal 50 of the mail delivery system 1 will now be described. Note that in the following description, an electronic mail addressed to the mobile communication terminal 50 that is received by the reception side mail server 40 from the transmission side mail server 20 will be referred to as a delivery mail. A delivery mail that is received by the mobile communication terminal 50 from the reception side mail server 40 will be referred to as a received mail.

Figure 2:
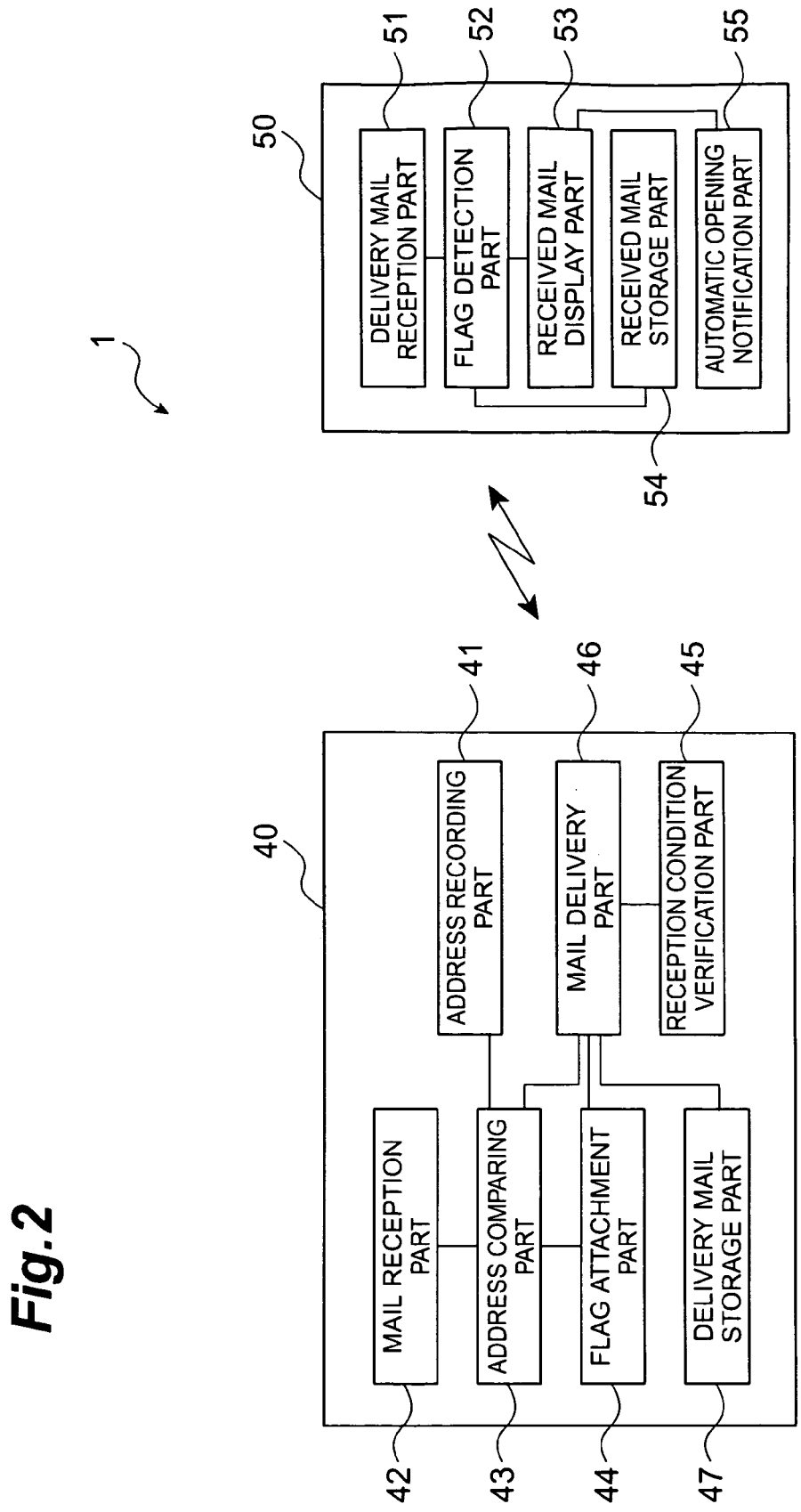
FIG. 2 is a functional block diagram of the reception side mail server and mobile communication terminal in FIG. 1.

FIG. 2 shows an outline of the characteristic functions in this embodiment of the reception side mail server 40 and mobile communication terminal 50.

The reception side mail server 40 comprises an address recording part (first recording means, second recording means) 41, a mail reception part 42, an address comparing part (first comparing means, second comparing means) 43, a flag attachment part 44, a reception condition verification part 45, a mail delivery part (first delivery means, second delivery means) 46, and a delivery mail storage part 47.

The address recording part 41 records as a recorded address an electronic mail address notified by the mobile communication terminal 50 for specifying a delivery mail on which redelivery processing and automatic opening processing are to be implemented. Here, redelivery processing refers to a process in which the reception side mail server 40 delivers a delivery mail repeatedly at predetermined time intervals. Automatic opening processing refers to a process in which the mobile communication terminal 50 opens an electronic mail received by the mobile communication terminal 50 automatically without the need of an operation by the user. In accordance with instructions from the mobile communication terminal 50, the address recording part 41 records electronic mail addresses and divides the recorded addresses into a first group to be redelivered every five minutes and a second group to be redelivered every thirty minutes.

The mail reception part 42 receives from the transmission side mail server 20 via the network 30 electronic mail transmitted to the mobile communication terminal 50 from the transmission source terminal 10. The delivery mail, which is the received electronic mail, is outputted to the address comparing part 43.

The address comparing part 43 compares the recorded addresses in the address recording part 41, or in other words the recorded addresses recorded in the first group and the recorded addresses recorded in the second group, with the transmission source address comprised in a delivery mail. When the transmission source address matches a recorded address, the address comparing part 43 outputs the delivery mail to the flag attachment part 44. When the transmission source address does not match a recorded address, the delivery mail is outputted to the mail delivery part 46.

The flag attachment part 44 attaches a first flag or a second flag to the delivery mail comprising the transmission source address which matches the recorded address, and then outputs the delivery mail to the mail delivery part 46. The flag attachment part 44 attaches the first flag to a delivery mail comprising a transmission source address which matches a recorded address recorded in the first group, and attaches the second flag to a delivery mail comprising a transmission source address which matches a recorded address recorded in the second group. In this embodiment, the first flag and second flag serve as redelivery identification information for redelivery processing and automatic opening identification information for automatic opening processing. Thus the flag attachment part 44 functions as identification information attachment means. The first flag and second flag serve as triggers for implementing processing whereby the mobile communication terminal 50, having received an electronic mail to which a flag is attached, automatically opens the electronic mail.

The reception condition verification part 45 determines whether or not the mobile communication terminal 50 is capable of receiving delivery mail. For example, when the field intensity from the communication device of the mobile communication terminal 50 equals or exceeds a predetermined level, the reception condition verification part 45 determines that the mobile communication terminal 50 is capable of receiving mail, and when the field intensity is below the predetermined level, it is determined that the mobile communication terminal 50 is incapable of receiving mail.

When the reception condition verification part 45 determines that the mobile communication terminal 50 is capable of receiving mail, the mail delivery part 46 delivers the delivery mail to the mobile communication terminal 50. The mail delivery part 46 also deletes the delivery mail after the delivery mail is delivered. When the reception condition verification part 45 determines that the mobile communication terminal 50 is incapable of receiving mail, the mail delivery part 46 outputs the delivery mail to the delivery mail storage part 47.

The mail delivery part 46 also possesses a redelivery function. That is, the mail delivery part 46 delivers a delivery mail to which the first flag is attached repeatedly at five minute intervals. The mail delivery part 46 delivers a delivery mail to which the second flag is attached repeatedly every thirty minutes. Note that if a delivery mail has not been delivered twenty-four hours after the delivery mail is received from the flag attachment part 44, the mail delivery part 46 deletes the delivery mail.

The delivery mail storage part 47 functions as a so-called "mail box". That is, the delivery mail storage part 47 stores delivery mail that has not yet been delivered by the mail delivery part 46.

The address recording part 41, mail reception part 42, address comparing part 43, flag attachment part 44, reception condition verification part 45, mail delivery part 46, and delivery mail storage part 47 of the reception side mail server 40, as described above, are realized by the installation in the reception side mail server 40 of a program for realizing in the reception side mail server 40 the functions described above corresponding respectively to each part. This program may be installed in the reception side mail server 40 in advance, or may be installed separately.

The functional constitution of the mobile communication terminal 50 will now be described. As shown in FIG. 2, the mobile communication terminal 50 is constituted by a delivery mail reception part 51, a flag detection part 52, a received mail display part 53, a received mail storage part 54, and an automatic opening notification part 55.

The delivery mail reception part 51 receives delivery mail delivered from the reception side mail server 40, and outputs the received mail, which is received delivery mail, to the flag detection part 52.

The flag detection part 52 determines whether the first flag or second flag is attached to the received mail. If the first flag or second flag is attached to the received mail, the flag detection part 52 outputs the received mail to the received mail display part 53. If the first flag or second flag is not attached to the received mail, the flag detection part 52 outputs the received mail to the received mail storage part 54.

The received mail display part 53 automatically opens the received mail received from the flag detection part 52 and displays the received mail on a display. In other words, the received mail display part 53 functions as first automatic opening means together with the flag detection part 52. Note that when the user is in conversation on the mobile communication terminal 50, the received mail display part 53 automatically opens the received mail once the conversation has ended. Further, when a plurality of received mails are received from the flag detection part 52 in series, the received mail display part 53 automatically opens the newest received mail and displays the mail on the display. When the received mail displayed on the display is closed, the received mail display part 53 displays the received mail received prior to the newest received mail.

When the received mail contains an attached file, the received mail display part 53 also automatically opens the attached file. The attached file may be opened after the so-called body of the received mail has been viewed, or in other words when the window of the body of the received mail is closed.

The received mail display part 53 also functions to receive an instruction from the user of the mobile communication terminal 50 via an input device such as a button to display a received mail stored in the received mail storage part 54 to be described below, and to display the indicated received mail.

The received mail storage part 54 stores received mails in which the first flag or second flag has not been detected by the flag detection part 52. The received mail storage part 54 also stores received mails that have been automatically opened and viewed.

The automatic opening notification part 55 transmits notification to the transmission source address comprised in a received mail that has been automatically opened by the received mail display part 53 that automatic opening of this received mail is complete.

The delivery mail reception part 51, flag detection part 52, received mail display part 53, received mail storage part 54, and automatic opening notification part 55 of the mobile communication terminal 50, as described above, are realized by the installation in the mobile communication terminal 50 of a program for realizing in the mobile communication terminal 50 the functions described above corresponding respectively to each part. This program may be installed in the mobile communication terminal 50 in advance, or may be installed separately.

Next, operations of the reception side mail server 40 and mobile communication terminal 50 in the mail delivery system 1 will be described.

Figure 3:
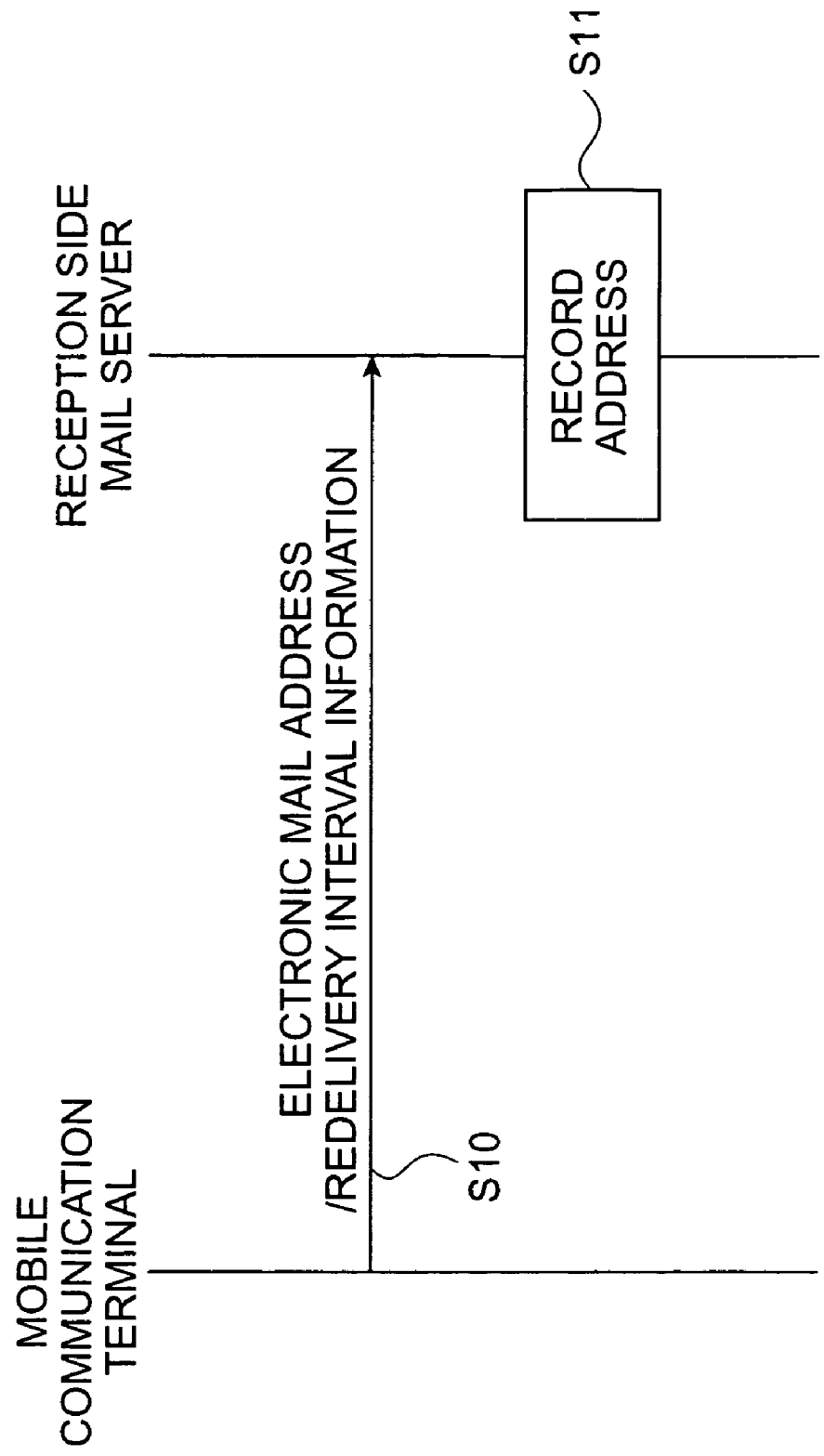
FIG. 3 is a view showing operations of the reception side mail server of FIG. 1 and the mobile communication terminal when an electronic mail address is recorded in the reception side mail server.

First, a case in which an electronic mail address of a sender is recorded in the reception side mail server 40 in order to implement redelivery processing and automatic opening processing will be described with reference to FIG. 3.

First, the mobile communication terminal 50 transmits to the reception side mail server 40 an electronic mail address specifying electronic mail on which redelivery processing and automatic opening processing are to be implemented in the reception side mail server 40, and information regarding the redelivery interval (five minutes or thirty minutes) of redelivery processing (S10).

Having received the electronic mail address and redelivery interval information from the mobile communication terminal 50, the address recording part 41 of the reception side mail server 40 records the electronic mail address as a recorded address in the group which matches the redelivery interval information (S11).

Figure 4:
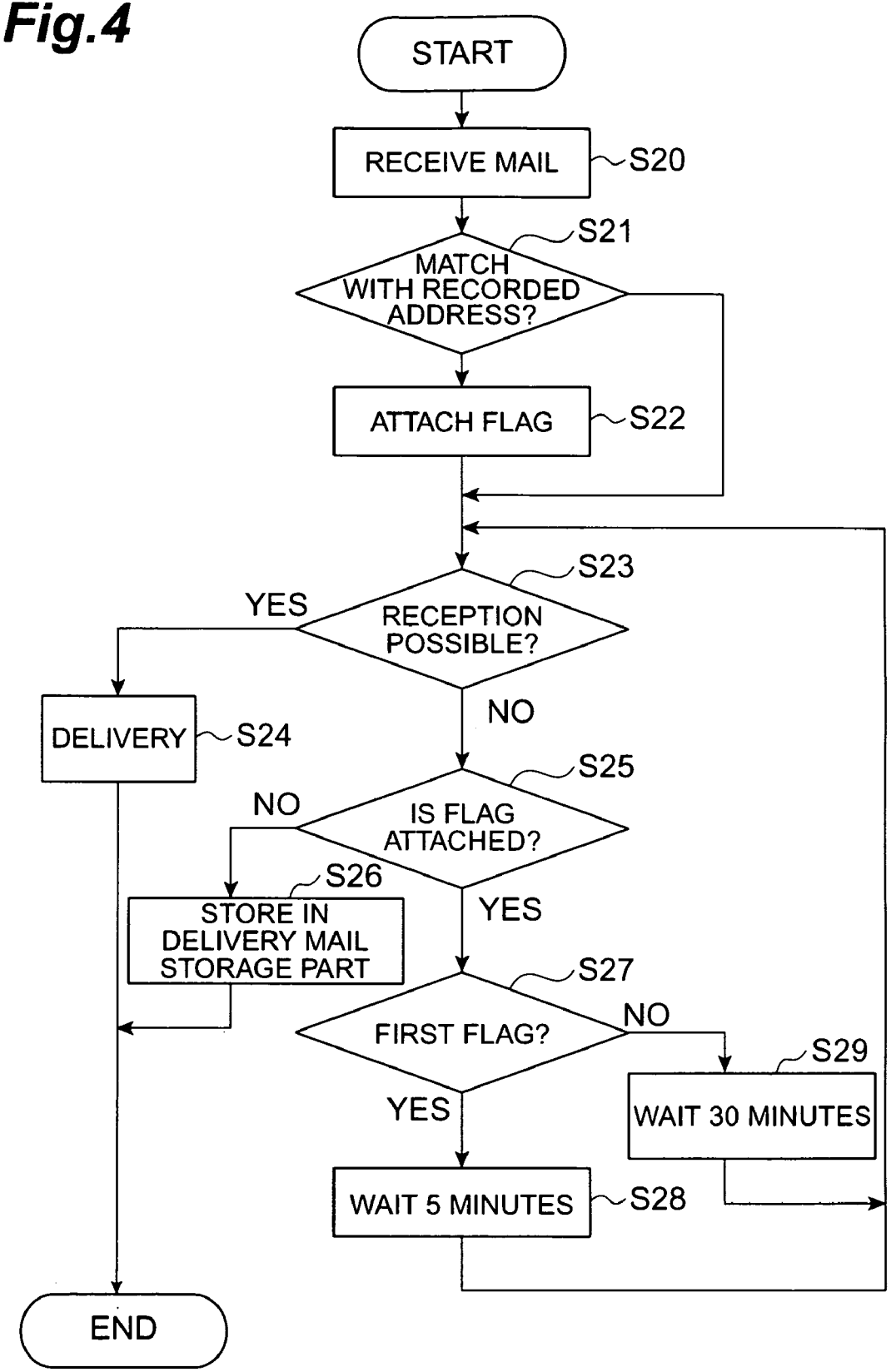
FIG. 4 is a flowchart showing an operation of the reception side mail server of FIG. 1.

Next, a processing operation performed on a delivery mail in the reception side mail server 40 will be described with reference to FIG. 4.

When an electronic mail is transmitted from the transmission source terminal 10 in FIG. 1 to the mobile communication terminal 50, the electronic mail is received by the mail reception part 42 of the reception side mail server 40 via the network 30 (S20).

The mail reception part 42 outputs the delivery mail, which is the received electronic mail, to the address comparing part 43. The address comparing part 43 compares the transmission source address comprised in the delivery mail to the recorded address recorded in the address recording part 41 (S21). The address comparing part 43 then outputs a delivery mail comprising a transmission source address which matches the recorded address to the flag attachment part 44 ("YES" in S21). Alternatively, the address comparing part 43 outputs a delivery mail comprising a transmission source address which does not match the recorded address to the mail delivery part 46. The first flag or second flag is attached to the delivery mail which is outputted to the flag attachment part 44 (S22). At this time, the first flag is attached to delivery mail comprising a transmission source address which matches a recorded address in the first group, and the second flag is attached to delivery mail comprising a transmission source address which matches a recorded address in the second group. Delivery mail to which the first flag or second flag has been attached by the flag attachment part 44 is outputted to the mail delivery part 46. Here, the reception condition verification part 45 determines whether or not the mobile communication terminal 50 is capable of receiving mail (S23). If the mobile communication terminal 50 is capable of receiving mail ("YES" in S23), the mail delivery part 46 delivers the delivery mail to the mobile communication terminal 50 (S24). If the mobile communication terminal 50 is incapable of receiving mail ("NO" in S23) and neither the first flag nor the second flag is attached to the delivery mail ("NO" in S25), the mail delivery part 46 stores the delivery mail in the delivery mail storage part 47 serving as a so-called mail box (S26). If the mobile communication terminal 50 is incapable of receiving mail ("NO" in S23) and either the first flag or second flag is attached to the delivery mail ("YES" in S25), the mail delivery part 46 determines whether the first flag or the second flag is attached (S27). If the first flag is attached to the delivery mail ("YES" in S27), the mail delivery part 46 redelivers the delivery mail five minutes later (S28), or in other words returns to S23. If the second flag is attached to the delivery mail ("NO" in S27), the mail delivery part 46 redelivers the delivery mail thirty minutes later (S29), or in other words returns to S23.

Note that the mail delivery part 46 deletes the delivery mail when the delivery mail is delivered. Further, if a delivery mail to which the first flag or second flag is attached has not been delivered twenty-four hours after the delivery mail is received from the flag attachment part 44, the mail delivery part 46 deletes the delivery mail.

Figure 5:
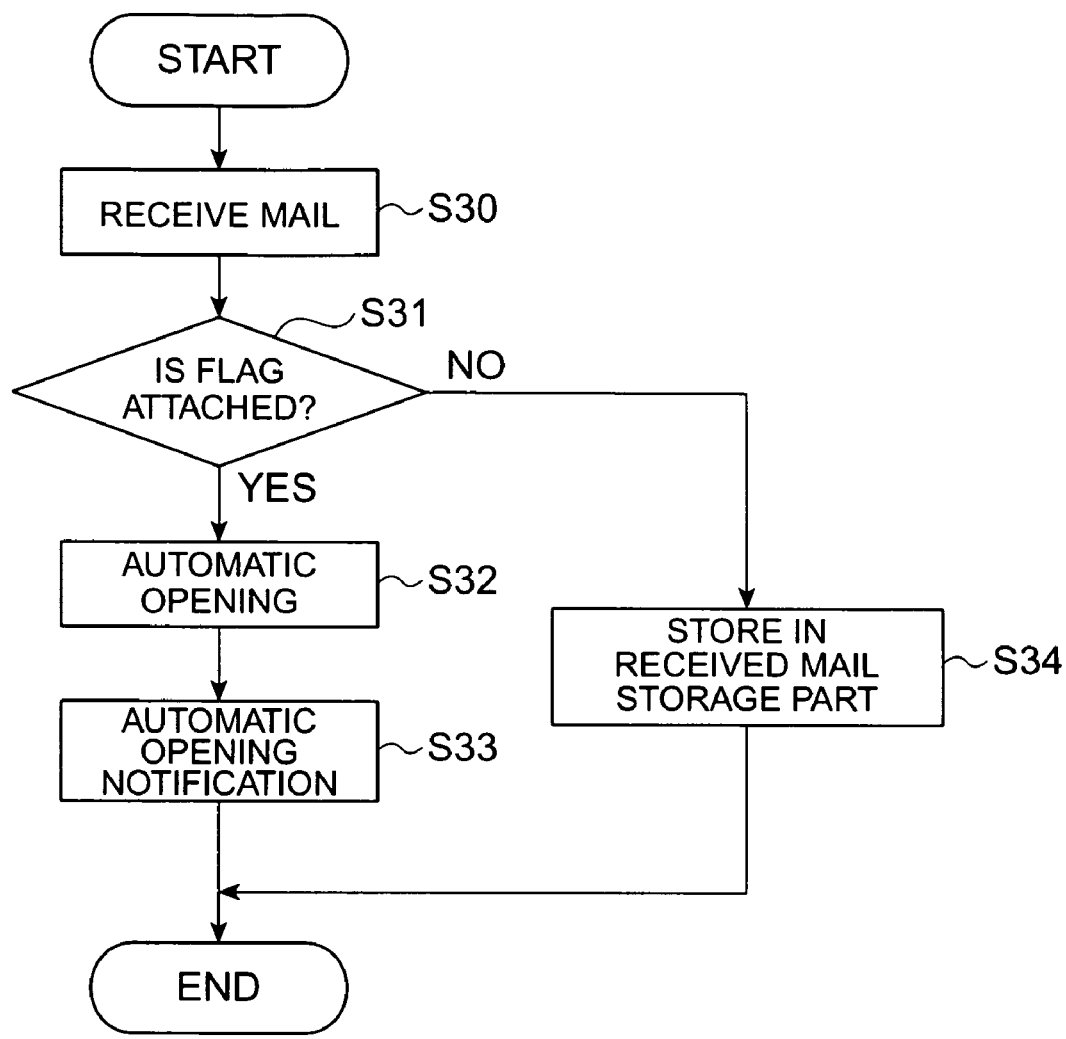
FIG. 5 is a flow chart showing an operation of the mobile communication terminal of FIG. 1.

Next, operations of the mobile communication terminal 50 when the mobile communication terminal 50 receives a delivery mail from the reception side mail server 40 will be described with reference to FIG. 5.

When the mail reception means 41 receive a delivery mail delivered from the reception side mail server 40 (S30), the flag detection part 52 determines whether the first flag or second flag is attached to the received mail (S31). If the first flag or second flag is attached to the received mail ("YES" in S31), the flag detection part 52 outputs the received mail to the received mail display part 53. Having received the received mail outputted from the flag detection part 52, the received mail display part 53 automatically opens the received mail and displays the received mail on a display (S32). At this time, the automatic opening notification part 55 transmits notification to the transmission source terminal 10 to the effect that automatic opening is complete (S33). If neither the first flag nor the second flag is attached to the received mail ("NO" in S31), the flag detection part 52 outputs the received mail to the received mail storage means 44 (S34).

Note that in this embodiment, delivery mail is delivered from the reception side mail server 40 automatically, but the operations of the mobile communication terminal 50 are similar in a case where the mobile communication terminal 50 accesses the reception side mail server 40 to obtain the delivery mail prior to redelivery, for example.

Next, the actions and effects of the reception side mail server 40 and mobile communication terminal 50 in the mail delivery system 1 of this embodiment will be described.

In the mail delivery system 1 of this embodiment, electronic mail addresses specifying electronic mail to be subjected to redelivery processing and automatic opening processing are recorded in the reception side mail server 40 from the mobile communication terminal 50. The reception side mail server 40 attaches the first flag or second flag to a delivery mail transmitted from the recorded address, which is the electronic mail address recorded in the reception side mail server 40, in order to implement both redelivery processing and automatic opening processing. The reception side mail server 40 then delivers the delivery mail to which the first flag or second flag is attached repeatedly to the mobile communication terminal 50. Meanwhile, when the mobile communication terminal 50 receives the delivery mail attached with the first flag or second flag, the received delivery mail is automatically opened.

As described above, electronic mail to be subjected to redelivery processing is specified by an electronic mail address, and hence the traffic on the mail delivery system 1 is reduced in comparison with a case in which redelivery processing is implemented on all delivery mail, for example. Further, the reception side mail server 40 performs redelivery processing on electronic mail delivered from an address that is recorded in the address recording part 41, and hence the mobile communication terminal 50 can receive electronic mail having as a transmission source address an address which is recorded in the reception side mail server 40 quickly and reliably. Moreover, the mobile communication terminal 50 implements automatic opening processing on electronic mail that has been redelivery processed, and hence the user of the mobile communication terminal 50 can read redelivery-processed electronic mail immediately. Hence according to the mail delivery system 1 of this embodiment as described above, the user of the mobile communication terminal 50 can obtain the information in an electronic mail comprising a recorded electronic mail address efficiently.

An advantage of a mobile communication terminal such as a portable telephone is that when carried by an elderly person or a child, the elderly person or child can be contacted by a family member. However, elderly people or children are sometimes unaccustomed to operating a mobile communication terminal. Hence in a conventional mail delivery system using a reception side mail server and a mobile communication terminal, electronic mail transmitted by a family member to a mobile communication terminal carried by an elderly person or child may not be read.

Further, when the user of the mobile communication terminal is participating in a meeting or lecture, the user often switches off the power of the mobile communication terminal in consideration of the effects on the surroundings caused when the mobile communication terminal is operated. As a result, the user of a mobile communication terminal who is participating in a meeting or lecture may be unable to read transmitted electronic mail.

In the mail delivery system 1 using the reception side mail server 40 and mobile communication terminal 50 of this embodiment, on the other hand, if the mobile communication terminal 50 is given to an elderly person or child after the electronic mail address of a family member has been recorded in the reception side mail server 40, an electronic mail transmitted by the family member is automatically displayed on the display of the mobile communication terminal 50 carried by the elderly person or child. Hence messages can be transmitted reliably to elderly people or children who are unaccustomed to operating the mobile communication terminal 50.

Further, even if the power of the mobile communication terminal 50 is switched off during a meeting or lecture, when the power of the mobile communication terminal 50 is switched on at the end of the meeting or the like, the mobile communication terminal 50 receives the electronic mail that has been redelivered from the reception side mail server 40 and automatically opens the electronic mail. Hence the user of the mobile communication terminal 50 can reliably obtain the information in an electronic mail transmitted from a specific electronic mail address when the meeting or the like ends. If the power is on during the meeting or lecture, electronic mail transmitted from the electronic mail address recorded in the reception side mail server 40 is automatically opened by the mobile communication terminal 50 and displayed on the display, and hence by switching off the incoming electronic mail tone in manner mode or the like, the information in an electronic mail from a specific sender can be obtained without disrupting the progress of the meeting or lecture by operating the mobile communication terminal 50.

The reception side mail server 40 is also capable of delivering a redelivery-processed delivery mail at differing time intervals according to instructions from the mobile communication terminal 50. In other words, an order of precedence is attached to the redelivery-processed delivery mail, and hence the user of the mobile communication terminal 50 is able to receive electronic mail from a sender with a higher priority level more quickly.

Figure 6:
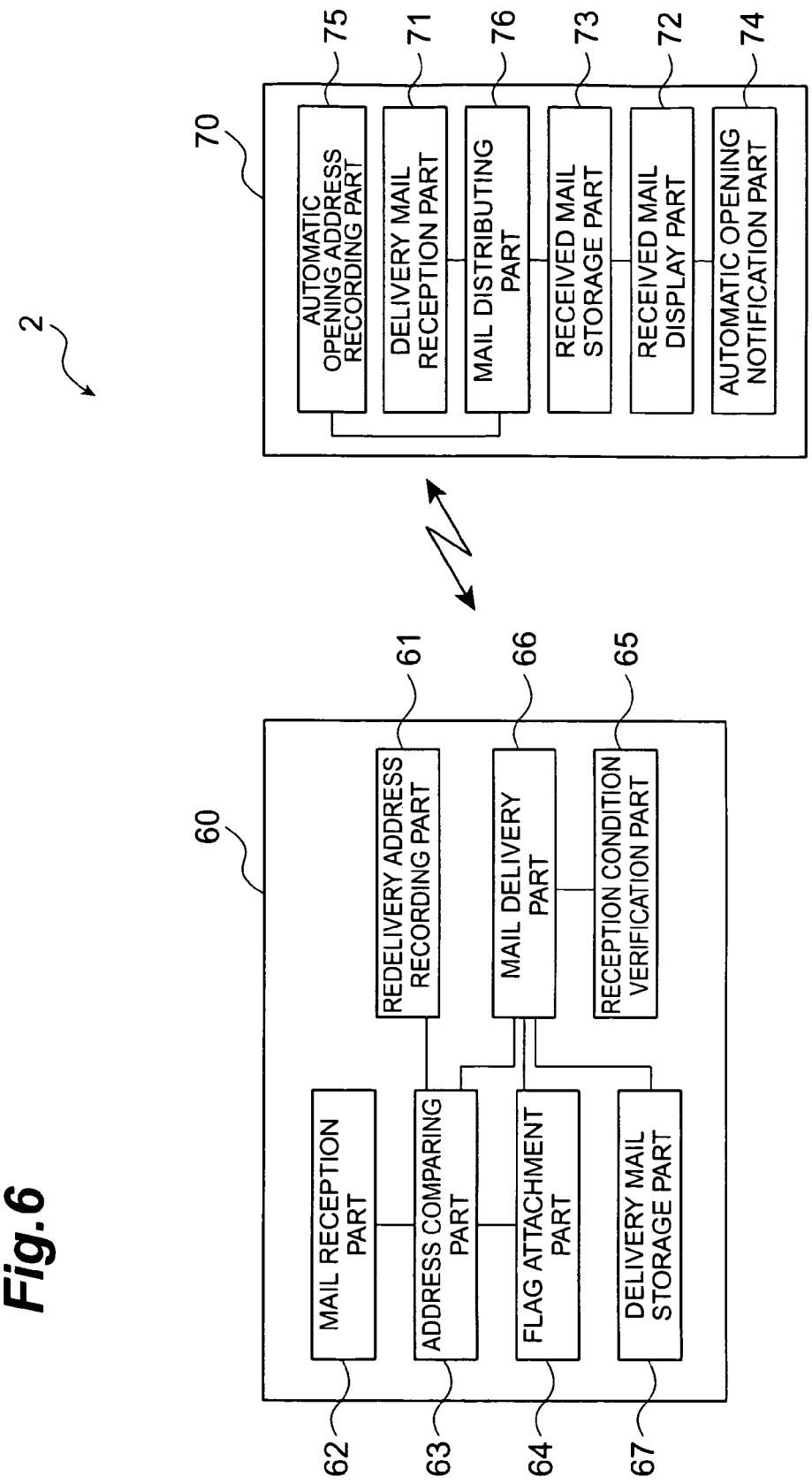
FIG. 6 is a functional block diagram of a reception side mail server and a mobile communication terminal according to a second embodiment.

Next, a second embodiment will be described. FIG. 6 is a functional block diagram of a reception side mail server 60 and a mobile communication terminal 70 in a mail delivery system 2 of the second embodiment.

The reception side mail server 60 comprises a redelivery address recording part 61, a mail reception part 62, an address comparing part 63, a flag attachment part 64, a reception condition verification part 65, a mail delivery part 66, and a delivery mail storage part 67.

The mail reception part 62, address comparing part 63, reception condition verification part 65, and delivery mail storage part 67 correspond respectively to the mail reception part 42, address comparing part 43, reception condition verification part 45, and delivery mail storage part 47 of the first embodiment.

The redelivery address recording part 61 records as a redelivery recorded address an electronic mail address notified by the mobile communication terminal 70 for specifying delivery mail on which redelivery processing is to be implemented. Note that redelivery recorded addresses are recorded after being divided into a first group comprising delivery mails to be redelivered every five minutes and a second group comprising delivery mails to be redelivered every thirty minutes in accordance with instructions from the mobile communication terminal 70.

The flag attachment part 64 attaches a first flag or a second flag to delivery mail comprising a transmission source address which matches a recorded address. Here, the flag attachment part 64 attaches the first flag, for implementing redelivery processing every five minutes, to a delivery mail comprising a transmission source address which matches a redelivery recorded address in the first group. The flag attachment part 64 attaches the second flag, for implementing redelivery processing every thirty minutes, to a delivery mail comprising a transmission source address which matches a redelivery recorded address in the second group. In this embodiment, the first flag and second flag function as identification information whereby the reception side mail server 60 implements redelivery processing.

The redelivery address recording part 61, mail reception part 62, address comparing part 63, flag attachment part 64, reception condition verification part 65, mail delivery part 66, and delivery mail storage part 67 of the reception side mail server 60, as described above, are realized by the installation in the reception side mail server 60 of a program for realizing the functions described above corresponding respectively to each part. This program may be installed in the reception side mail server 60 in advance, or may be installed in the reception side mail server separately.

The mobile communication terminal 70 comprises a delivery mail reception part 71, a received mail display part 72, a received mail storage part 73, an automatic opening notification part 74, an automatic opening address recording part (third recording means) 75, and a mail distributing part 76.

The automatic opening address recording part 75 receives recording of an electronic mail address specifying delivery mail to be subjected to automatic opening processing from among the delivery mail delivered to the mobile communication terminal 70 from the reception side mail server 60. The automatic opening address recording part 75 records the received electronic mail address as an automatic opening recorded address.

The delivery mail reception part 71 receives delivery mail from the reception side mail server 60. The delivery mail reception part 71 outputs the received mail, which is the received delivery mail, to the mail distributing part 76.

The received mail storage part 73 stores received mail. When an electronic mail address is recorded as an automatic opening recorded address by the automatic opening address recording part 75, the received mail storage part 73 creates a first folder for storing received mail transmitted from the automatic opening recorded address, and a second folder for storing received mail transmitted from addresses other than the automatic opening recorded address.

The mail distributing part 76 compares the transmission source address comprised in the received mail with the automatic opening recorded address recorded in the automatic opening address recording part 75. The mail distributing part 76 outputs received mail comprising a transmission source address that matches the automatic opening recorded address to the first folder of the received mail storage part 73. The mail distributing part 76 outputs received mail comprising a transmission source address that does not match the automatic opening recorded address to the second folder of the received mail storage part 73.

The received mail display part 72 automatically opens received mail stored in the second folder of the received mail storage part 73 and displays this mail on a display. In other words, the received mail display part 72 functions as second automatic opening processing means together with the mail distributing part 76. The received mail display part 72 also functions to receive an instruction from the user of the mobile communication terminal 70 through an input device such as a button to display received mail stored in the first folder of the received mail storage part 73 to be described below, and to display the indicated received mail. The automatic opening notification part 74 corresponds to the automatic opening notification part 55 of the first embodiment.

The delivery mail reception part 71, received mail display part 72, received mail storage part 73, automatic opening notification part 74, automatic opening address recording part 75, and mail distributing part 76 of the mobile communication terminal 70, as described above, are realized by the installation in the mobile communication terminal 70 of a program for realizing in the mobile communication terminal 70 the functions described above corresponding respectively to each part. This program may be installed in the mobile communication terminal 70 in advance, or may be installed separately.

Next, operations of the mobile communication terminal 70 and reception side mail server 60 during recording of an electronic mail address in order to specify electronic mail on which the automatic opening processing of the second embodiment is to be implemented, and recording of an electronic mail address in order to specify electronic mail on which the redelivery processing of the second embodiment is to be implemented will be described.

An electronic mail address for specifying electronic mail on which automatic opening processing is to be implemented is recorded in the mobile communication terminal 70. More specifically, when an electronic mail address specifying electronic mail on which automatic opening processing is to be implemented is inputted into the mobile communication terminal 70 through an input device such as a button, the automatic opening address recording part 75 receives the electronic mail address as an automatic opening recorded address. Thus an electronic mail address for implementing automatic opening processing is recorded in the automatic opening address recording part 75 as an automatic opening recorded address. At this time, the received mail storage part 73 creates the second folder.

An electronic mail address specifying electronic mail on which redelivery processing is to be implemented is recorded in the reception side mail server 60. The operations of the mobile communication terminal 70 and reception side mail server 60 accompanying this recording are similar to those of the first embodiment. That is, the mobile communication terminal 50 informs the reception side mail server 60 of the electronic mail address specifying electronic mail on which redelivery processing is to be implemented, whereupon the reception side mail server 60 records the electronic mail address.

Operations of the reception side mail server 60 up to the delivery of delivery mail, or in other words electronic mail received by the reception side mail server 60, are identical to those of the first embodiment except for the fact that the first flag or second flag attached to the delivery mail functions only as identification information for implementing redelivery processing.

Figure 7:
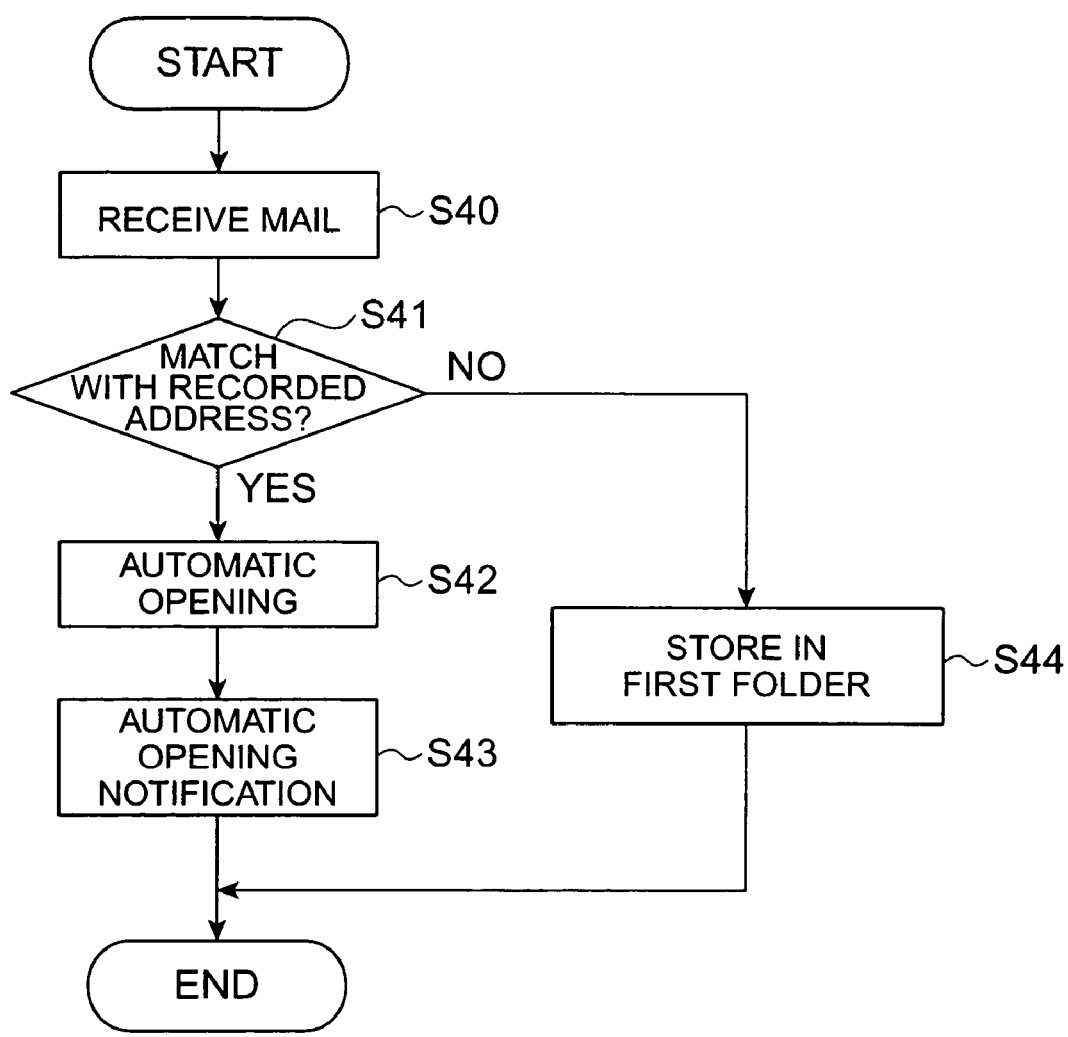
FIG. 7 is a flow chart showing an operation of the mobile communication terminal of FIG. 6.

Next, operations of the mobile communication terminal 70 when a delivery mail delivered from the reception side mail server 60 is received will be described with reference to FIG. 7.

When the delivery mail reception part 71 receives delivery mail (S40), the mail is outputted to the mail distributing part 76. The mail distributing part 76 compares the transmission source address comprised in the received mail to the automatic opening recorded address in the automatic opening address recording part 75 (S41). The mail distributing part 76 then outputs received mail comprising a transmission source address that matches the automatic opening recorded address to the second folder of the received mail storage part 73. If received mail is stored in the second folder, the received mail display part 72 automatically opens the received mail and displays the mail on a display (S42). At this time, the automatic opening notification part 74 transmits notification that the received mail has been automatically opened to the transmission source terminal 10 (S43). Received mail having a different transmission source address to the automatic opening recorded address is stored in the first folder of the received mail storage part 73 (S44).

The actions and effects of the reception side mail server 60 and mobile communication terminal 70 in the mail delivery system 2 of the second embodiment will now be described.

In the mail delivery system 2 in the second embodiment, an electronic mail address specifying electronic mail to be subjected to redelivery processing is recorded in the reception side mail server 60 as a redelivery recorded address. If the transmission source address of a delivery mail, which is a received electronic mail, matches the redelivery recorded address, the reception side mail server 60 delivers the delivery mail comprising this transmission source address to the mobile communication terminal 70 repeatedly at predetermined time intervals. Hence the mobile communication terminal 70 is able to reliably obtain electronic mail transmitted from a specific electronic mail address.

The mobile communication terminal 70 is also capable of recording an electronic mail address specifying electronic mail to be subjected to automatic opening processing as an automatic opening recorded address. If the transmission source address of a received mail, which is a received electronic mail, matches the automatic opening recorded address, the mobile communication terminal 70 automatically opens the received mail. Hence the user of the mobile communication terminal 70 is able to view electronic mail from a specific electronic mail address reliably upon reception of the electronic mail.

As described above, electronic mail addresses specifying electronic mail on which redelivery processing is to be implemented can be recorded in the reception side mail server 60, and electronic mail addresses specifying electronic mail on which automatic opening processing is to be implemented can be recorded in the mobile communication terminal 70, and thus in the mail delivery system 2 constituted by the reception side mail server 60 and mobile communication terminal 70, electronic mail to be subjected to redelivery processing and electronic mail to be subjected to automatic opening processing can be separated.

A first embodiment and second embodiment were described above, but the present invention is not limited to these two embodiments. For example, the redelivery intervals were set at five minutes or thirty minutes, but redelivery intervals are not limited to five minutes and thirty minutes, and may be ten minutes. Further, electronic mail to be subjected to redelivery processing was divided into groups according to differences in the redelivery interval, but the mail may be divided into groups according to differences in the number of times the mail is redelivered, for example electronic mail that is redelivered only once, and electronic mail that is redelivered until received. In the two embodiments described above, the mail delivery part 46 in the first embodiment and the mail delivery part 66 in the second embodiment are set to delete electronic mail for redelivery twenty-four hours after reception, but this is not limited to twenty-four hours, and the mail may be deleted after twelve hours, forty-eight hours, and so on, for example.

Further, provision is made in the first embodiment such that when an electronic mail address is recorded in the address recording part 41 of the reception side mail server 40, the first flag or second flag for implementing both redelivery processing and automatic opening processing is attached to the delivery mail. However, electronic mail addresses specifying electronic mail to be subjected to redelivery processing and electronic mail addresses specifying electronic mail to be subjected to automatic opening processing may be recorded separately. In this case, a flag for implementing redelivery processing may be attached to delivery mail comprising as a transmission source address an electronic mail address specifying electronic mail to be subjected to redelivery processing, and a flag for implementing automatic opening processing may be attached to delivery mail having as a transmission source address an electronic mail address specifying electronic mail to be subjected to automatic opening processing. The mobile communication terminal may be set so as to automatically open a received mail when the flag for implementing automatic opening is detected.

Further, in the first embodiment, the reception side mail server 40 attaches the first flag or second flag to delivery mail as automatic opening identification information, but the present invention is not limited to the use of flags such as the first flag and second flag. For example, alphanumerical characters such as "automatic opening" may be inserted into the body or title of the electronic mail. In this case, the mobile communication terminal 50 may be set so as to detect the alphanumerical characters "automatic opening" from the body or title, and to automatically open delivery mail comprising the characters when the characters are detected.

What is claimed is:

1. A mail server for delivering to a mobile communication terminal electronic mail addressed to said mobile communication terminal, comprising:

recording means for recording an address identified by said mobile communication terminal as a recorded address;

comparing means for comparing a transmission source address in an electronic mail addressed to said mobile communication terminal with said recorded address recorded by said recording means; and delivery means which, when said recorded address and said transmission source address match according to the comparison performed by said comparing means, deliver electronic mail comprising this transmission source address repeatedly to said mobile communication terminal, wherein said recording means records addresses identified by said mobile communication terminal as recorded addresses each having different redelivery intervals in accordance with instructions from said mobile communication terminal, said comparing means compares said transmission source address with said recorded addresses each having different redelivery intervals, and said delivery means delivers electronic mail comprising a transmission source address which matches said recorded address repeatedly at the redelivery interval recorded for said recorded address which matches said transmission source address in the comparison performed by said comparing means.

2. A mail server for delivering to a mobile communication terminal electronic mail addressed to said mobile communication terminal, comprising:

recording means for recording an address identified by said mobile communication terminal as a recorded address;

comparing means for comparing a transmission source address in an electronic mail addressed to said mobile communication terminal with said recorded address recorded by said recording means; and delivery means which, when said recorded address and said transmission source address match according to the comparison performed by said comparing means, deliver electronic mail comprising this transmission source address repeatedly to said mobile communication terminal, wherein said recording means records addresses identified by said mobile communication terminal as recorded addresses each having a different number of redelivery times in accordance with instructions from said mobile communication terminal, said comparing means compares said transmission source address with said recorded addresses each having a different number of redelivery times, and said delivery means delivers electronic mail comprising a transmission source address which matches said recorded address repeatedly up to the number of redelivery times recorded for said recorded address which matches said transmission source address in the comparison performed by said comparing means.

3. A mail server for delivering to a mobile communication terminal electronic mail addressed to said mobile communication terminal, comprising:

recording means for recording an address identified by said mobile communication terminal as a recorded address;

comparing means for comparing a transmission source address in an electronic mail addressed to said mobile communication terminal with said recorded address recorded by said recording means;

identification information attachment means which, when said recorded address and said transmission source address match according to the comparison performed by said comparing means, attach to an electronic mail comprising this transmission source address automatic opening identification information serving as a trigger for implementing processing to cause said mobile communication terminal to automatically open the electronic mail upon reception of the electronic mail; and delivery means for delivering to said mobile communication terminal electronic mail to which said automatic opening identification information is attached.

4. A mobile communication terminal for receiving electronic mail from a mail server which functions to deliver electronic mail after attaching automatic opening identification information to an electronic mail comprising a recorded address as a transmission source address, said automatic opening identification information serving as a trigger for implementing processing to cause said mobile communication terminal to automatically open the electronic mail upon reception of the electronic mail, comprising:

means for receiving said electronic email from transmission source address corresponding to said recorded address and including automatic opening identification information; and automatic opening means which, when said electronic mail delivered from said mail server is received and automatic opening identification information is detected in said electronic mail, automatically opens said electronic mail.

5. A mail server for delivering to a mobile communication terminal electronic mail addressed to said mobile communication terminal, comprising:

a recording device configured to record an address identified by said mobile communication terminal as a recorded address;

a comparing device configured to compare a transmission source address in an electronic mail addressed to said mobile communication terminal with said recorded address recorded by said recording device; and a delivery device which, when said recorded address and said transmission source address match according to the comparison performed by said comparing device, deliver electronic mail comprising this transmission source address repeatedly to said mobile communication terminal, wherein said recording device records addresses identified by said mobile communication terminal as recorded addresses each having different redelivery intervals in accordance with instructions from said mobile communication terminal, said comparing device compares said transmission source address with said recorded addresses each having different redelivery intervals, and said delivery device delivers electronic mail comprising a transmission source address which matches said recorded address repeatedly at the redelivery interval recorded for said recorded address which matches said transmission source address in the comparison performed by said comparing device.

6. A mail server for delivering to a mobile communication terminal electronic mail addressed to said mobile communication terminal, comprising:

a recording device configured to record an address identified by said mobile communication terminal as a recorded address;

a comparing device configured to compare a transmission source address in an electronic mail addressed to said mobile communication terminal with said recorded address recorded by said recording device; and a delivery device which, when said recorded address and said transmission source address match according to the comparison performed by said comparing device, deliver electronic mail comprising this transmission source address repeatedly to said mobile communication terminal, wherein said recording device records addresses identified by said mobile communication terminal as recorded addresses each having a different number of redelivery times in accordance with instructions from said mobile communication terminal, said comparing device compares said transmission source address with said recorded addresses each having a different number of redelivery times, and said delivery device delivers electronic mail comprising a transmission source address which matches said recorded address repeatedly up to the number of redelivery times recorded for said recorded address which matches said transmission source address in the comparison performed by said comparing device.

7. A mail server for delivering to a mobile communication terminal electronic mail addressed to said mobile communication terminal, comprising:

a recording device configured to record an address identified by said mobile communication terminal as a recorded address;

a comparing device configured to compare a transmission source address in an electronic mail addressed to said mobile communication terminal with said recorded address recorded by said recording device;

an identification information attachment device which, when said recorded address and said transmission source address match according to the comparison performed by said comparing device, attach to an electronic mail comprising this transmission source address automatic opening identification information serving as a trigger for implementing processing to cause said mobile communication terminal to automatically open the electronic mail upon reception of the electronic mail; and a delivery device configured to deliver to said mobile communication terminal electronic mail to which said automatic opening identification information is attached.

8. A mobile communication terminal for receiving electronic mail from a mail server which functions to deliver electronic mail after attaching automatic opening identification information to an electronic mail comprising a recorded address as a transmission source address, said automatic opening identification information serving as a trigger for implementing processing to cause said mobile communication terminal to automatically open the electronic mail upon reception of the electronic mail, comprising:

a receiver configured to receive said electronic email from transmission source address corresponding to said recorded address and including automatic opening identification information; and an automatic opening device which, when said electronic mail delivered from said mail server is received and automatic opening identification information is detected in said electronic mail, automatically open said electronic mail.

9. A method for delivering from a mail server to a mobile communication terminal electronic mail addressed to said mobile communication terminal, comprising:

recording an address identified by said mobile communication terminal as a recorded address;

comparing a transmission source address in an electronic mail addressed to said mobile communication terminal with said recorded address recorded in said recording step; and when said recorded address and said transmission source address match according to the comparison performed in said comparing step, delivering electronic mail comprising this transmission source address repeatedly to said mobile communication terminal, wherein said recording step records addresses identified by said mobile communication terminal as recorded addresses each having different redelivery intervals in accordance with instructions from said mobile communication terminal, said comparing step compares said transmission source address with said recorded addresses each having different redelivery intervals, and said delivery step delivers electronic mail comprising a transmission source address which matches said recorded address repeatedly at the redelivery interval recorded for said recorded address which matches said transmission source address in the comparison performed in said comparing step.

10. A method for delivering from a mail server to a mobile communication terminal electronic mail addressed to said mobile communication terminal, comprising:

recording an address identified by said mobile communication terminal as a recorded address;

comparing a transmission source address in an electronic mail addressed to said mobile communication terminal with said recorded address recorded in said recording step; and when said recorded address and said transmission source address match according to the comparison performed in said comparing step, delivering electronic mail comprising this transmission source address repeatedly to said mobile communication terminal, wherein said recording step records addresses identified by said mobile communication terminal as recorded addresses each having a different number of redelivery times in accordance with instructions from said mobile communication terminal, said comparing step compares said transmission source address with said recorded addresses each having a different number of redelivery times, and said delivery step delivers electronic mail comprising a transmission source address which matches said recorded address repeatedly up to the number of redelivery times recorded for said recorded address which matches said transmission source address in the comparison performed in said comparing step.

11. A method for delivering to a mobile communication terminal electronic mail addressed to said mobile communication terminal, comprising:

recording an address identified by said mobile communication terminal as a recorded address;

comparing a transmission source address in an electronic mail addressed to said mobile communication terminal with said recorded address recorded in said recording step;

when said recorded address and said transmission source address match according to the comparison performed in said comparing step, attaching to an electronic mail comprising this transmission source address automatic opening identification information serving as a trigger for implementing processing to cause said mobile communication terminal to automatically open the electronic mail upon reception of the electronic mail; and delivering to said mobile communication terminal electronic mail to which said automatic opening identification information is attached.

12. A method for receiving electronic mail at a mobile communication terminal from a mail server which functions to deliver electronic mail after attaching automatic opening identification information to an electronic mail comprising a recorded address as a transmission source address, said automatic opening identification information serving as a trigger for implementing processing to cause said mobile communication terminal to automatically open the electronic mail upon reception of the electronic mail, comprising:

receiving said electronic email from transmission source address corresponding to said recorded address and including automatic opening identification information; and when said electronic mail delivered from said mail server is received and automatic opening identification information is detected in said electronic mail, automatically opening said electronic mail.

* * * * *